(12) United States Patent
Meen

(10) Patent No.: US 10,489,039 B2
(45) Date of Patent: Nov. 26, 2019

(54) ELECTRONIC APPARATUS AND OPERATING METHOD THEREOF

(71) Applicant: Samsung Electronics Co., Ltd., Gyeonggi-do (KR)

(72) Inventor: Young-Jae Meen, Seoul (KR)

(73) Assignee: Samsung Electronics Co., Ltd (KR)

( * ) Notice: Subject to any disclaimer, the term of this patent is extended or adjusted under 35 U.S.C. 154(b) by 297 days.

(21) Appl. No.: 15/253,236

(22) Filed: Aug. 31, 2016

(65) Prior Publication Data

US 2017/0060401 A1    Mar. 2, 2017

(30) Foreign Application Priority Data

Sep. 1, 2015 (KR) .......................... 10-2015-0123606

(51) Int. Cl.
```
G06F 3/048      (2013.01)
G06F 3/0484     (2013.01)
G06F 9/451      (2018.01)
G06F 9/445      (2018.01)
```
(52) U.S. Cl.
CPC ...... *G06F 3/04847* (2013.01); *G06F 3/04842* (2013.01); *G06F 9/44505* (2013.01); *G06F 9/451* (2018.02); *Y02D 10/43* (2018.01)

(58) Field of Classification Search
CPC ....................................................... G06F 3/048
See application file for complete search history.

(56) References Cited

U.S. PATENT DOCUMENTS

| | | | |
|---|---|---|---|
| 2002/0040286 A1* | 4/2002 | Inoko | G05B 19/05 703/13 |
| 2002/0108010 A1* | 8/2002 | Kahler | G06F 9/4411 710/305 |
| 2013/0007665 A1* | 1/2013 | Chaudhri | H04L 51/24 715/830 |
| 2014/0300610 A1 | 10/2014 | Mayhew | |
| 2015/0026615 A1* | 1/2015 | Choi | G06F 3/0484 715/765 |

FOREIGN PATENT DOCUMENTS

| | | |
|---|---|---|
| CN | 103582873 | 2/2014 |
| WO | WO 2006/108288 | 10/2006 |
| WO | WO 2012/170446 | 12/2012 |

OTHER PUBLICATIONS

European Search Report dated Jan. 25, 2017 issued in counterpart application No. 16186517.5-1954, 7 pages.
Chinese Office Action dated Jan. 11, 2019 issued in counterpart application No. 201610795891.3, 19 pages.
European Search Report dated Apr. 11, 2019 issued in counterpart application No. 16186517.5-1224, 4 pages.
Chinese Office Action dated Jun. 17, 2019 issued in counterpart application No. 201610795891.3, 17 pages.

* cited by examiner

*Primary Examiner* — Pei Yong Weng
(74) *Attorney, Agent, or Firm* — The Farrell Law Firm, P.C.

(57) ABSTRACT

An electronic device and an operation method for operating the electronic device are provided to display at least one condition line based on notification conditions; determine at least a part of a section as an activation section for activating at least one object in the at least one condition line; and configure the activation section corresponding to the notification conditions.

18 Claims, 14 Drawing Sheets

ELECTRONIC APPARATUS AND OPERATING METHOD THEREOF

PRIORITY

This application claims priority under 35 U.S.C. § 119(a) to Korean Patent Application Serial No. 10-2015-0123606, which was filed in the Korean Intellectual Property Office on Sep. 1, 2015, the entire content of which is incorporated herein by reference.

BACKGROUND

1. Field of the Disclosure

The present disclosure generally relates to an electronic device and an operational method thereof.

2. Description of the Related Art

In general, an electronic device may perform complex functions through a combination of various functions, including a screen configuration function. Accordingly, the electronic device may generate screen configuration information for an external device to provide the screen configuration information. For example, the electronic device may determine at least one object to be displayed on a screen and generate screen configuration information corresponding to an object. Thus, the external device may display the object on the screen on the basis of the screen configuration information received from the electronic device.

However, both electronic devices may generate the screen configuration information according to a script having a predetermined sentence. That is, when a user of the electronic device writes a script, the electronic device may generate the screen configuration information on the basis of the script. Therefore, when the user of the electronic device is not used to write the script, the electronic device may not generate the screen configuration information. That is, the electronic device may not easily generate the screen configuration information. Accordingly, user efficiency and user-convenience of the electronic device may be reduced.

SUMMARY

In accordance with an aspect of the present disclosure, a method of operating an electronic device is provided. The method includes displaying at least one condition line based on a plurality of notification conditions; determining at least a part of a section as an activation section for activating at least one object in the at least one condition line; and configuring the activation section corresponding to at least one of the plurality of notification conditions.

In accordance with another aspect of the present disclosure, an electronic device is provided that includes display unit; and a controller functionally connected to the display unit, and configured to control displaying of at least one condition line based on a plurality of notification conditions, determining of at least a part of a section as an activation section for activating at least one object in the at least one condition line, and configuring the activation section corresponding to at least one of the plurality of notification conditions.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
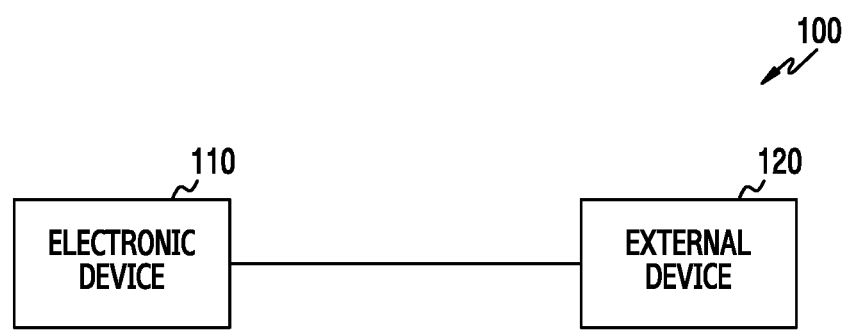
FIG. 1 is a block diagram illustrating a communication system according to an embodiment of the present disclosure.

Hereinafter, various embodiments of the present disclosure will be described in detail with reference to the accompanying drawings. Here, it is noted that identical reference numerals denote the same structural elements in the accompanying drawings. The detailed description of known functions and structures will be omitted to avoid an obscuring the subject matter of the present disclosure.

Figure 2:
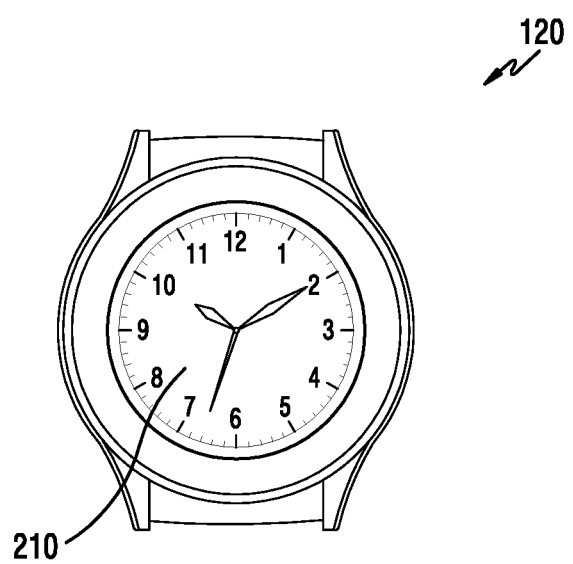
FIG. 2 illustrates a communication system according to an embodiment of the present disclosure.

FIG. 1 is a block diagram illustrating a communication system according to an embodiment of the present disclosure. Further, FIG. 2 illustrates a communication system according to an embodiment of the present disclosure.

Referring to FIG. 1, a communication system 100 includes an electronic device 110 and an external device 120.

The electronic device 110 may perform various functions. Herein, the electronic device 110 may include a Personal Computer (PC), a notebook, a netbook, a Personal Digital Assistants (PDA), a smart phone, and a wearable device. A detailed configuration of the electronic device 110 will be described with reference to FIG. 3.

In this event, the electronic device 110 may perform a screen configuration function. Accordingly, the electronic device 110 may generate screen configuration information for the external device 120. For example, the electronic device 110 may generate screen configuration information for a screen of the external device 120. Herein, the electronic device 110 may generate the screen configuration information corresponding to at least one notification condition. Further, the electronic device 110 may generate the screen configuration information on the basis of a time or a ratio. For example, the electronic device 110 may associate at least one object according to time or the ratio. Further, the electronic device 110 may provide the screen configuration information. For example, the electronic device 110 may directly provide the screen configuration information to the external device 120. In addition, the electronic device 110 may register the screen configuration information on a server.

The external device 120 may perform various functions. Herein, the external device 120 may include a Personal Computer (PC), a notebook, a netbook, a Personal Digital Assistants (PDA), a smart phone, and a wearable device. For example, the external device 120 may be a wristwatch-type wearable device as shown in FIG. 2. Further, the external device 120 may include a display element 210.

In this event, the external device 120 may display a screen on the basis of the screen configuration information. To this end, the external device 120 may receive the screen configuration information. Herein, the external device 120 may receive the screen configuration information corresponding to at least one notification condition of a plurality of notification conditions. For example, the external device 120 may directly receive the screen configuration information from the electronic device 110. In addition, the external device 120 may download the screen configuration information from the server. Accordingly, the external device 120 may activate the at least one object corresponding to the at least one notification condition. Further, the external device 120 may activate the at least one object according to time or the ratio.

Figure 3:
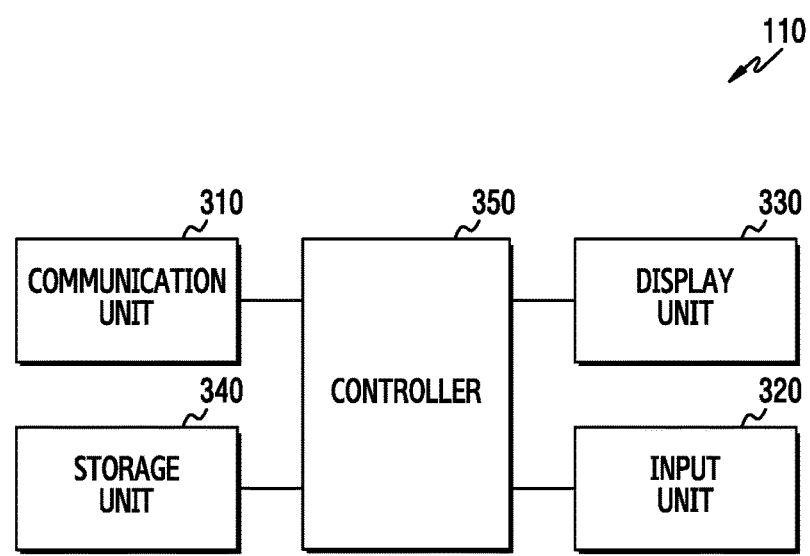
FIG. 3 is a block diagram illustrating an electronic device according to an embodiment of the present disclosure.

FIG. 3 is a block diagram illustrating an electronic device according to an embodiment of the present disclosure.

Referring to FIG. 3, the electronic device 110 includes a communication unit 310, an input unit 320, a display unit 330, a storage unit 340, and a controller 350.

The communication unit 310 may perform communication in the electronic device 110. In this event, the communication unit 310 may perform communication in various communication schemes. Herein, the communication unit 310 may perform at least one of wireless communication and wired communication. To this end, the communication unit 310 may access the Internet. Further, the communication unit 310 may access at least one of a mobile communication network and a data communication network. Otherwise, the communication unit 310 may perform short-range communication. The communication unit 310 may include at least one wireless antenna. For example, communication schemes may include at least one among long term evolution (LTE), wideband code division multiple access (WCDMA), global system for mobile communications (GSM), Wi-Fi, Bluetooth, and near field communications (NFC).

The input unit 320 may generate input data in the electronic device 110. At this time, the input unit 320 may generate the input data to correspond to a user input of the electronic device 110. Further, the input unit 320 may include at least one input device. The input unit 320 may include a keyboard, a key pad, a dome switch, a physical button, a touch panel, a jog & shuttle, and a sensor.

The display unit 330 may output display data in the electronic device 110. The display unit 330 may include at least one among a liquid crystal display (LCD), a light emitting diode (LED) display, an organic LED (OLED) display, a micro electro mechanical system (MEMS) display, and an electronic paper display. Here, the display unit 330 may be implemented as a touch screen while being coupled to the input unit 320.

The storage unit 340 may store operation programs of the electronic device 110. In this event, the storage unit 340 may store programs for performing a screen configuration function. Herein, the storage unit 340 may store programs for generating the screen configuration information. Meanwhile, the storage unit 340 may store programs for providing the screen configuration information. Further, the storage unit 340 may store data generated while the programs are executed. Further, the storage unit 340 may store the screen configuration information.

The controller 350 may control an overall operation of the electronic device 110. To this end, the controller 350 may be functionally connected to elements of the electronic device 110 so as to control the elements of the electronic device 110. Further, the controller 350 may receive a command or data from the elements of the electronic device 110 and then process the command or data. Further, the controller 350 may perform various functions.

In this event, the controller 350 may perform a screen configuration function. Accordingly, the controller 350 may generate screen configuration information for the external device 120. Herein, the controller 350 may generate the screen configuration information corresponding to at least one of the plurality of notification conditions. For example, the notification conditions may include at least one among a timeline over time, a battery state depending on the electric capacity in a battery, a charging state depending on whether the battery is charged, a water intake state depending on the water intake of a user, a notification state depending on a notification event, a moon state depending on a change of the shape of the moon, a heartbeat state depending on a heartbeat of the user, a workout state depending on the posture or a movement of the user, and a caffeine intake state depending on the caffeine intake of the user. Further, the controller 350 may generate the screen configuration information on the basis of the time or the ratio. For example, the controller 350 may associate the at least one object according to time or the ratio.

To this end, the controller 350 may display a configuration screen. In this event, the configuration screen may include a condition configuration window for notification conditions. Further, the condition configuration window may include a condition tab representing the notification conditions, at least one object item, and at least one condition line which corresponds to the object items, respectively. Each object may be allocated to each of the object items. The condition line may be defined as the time or the ratio. For example, the condition lines may be a bar-type graph that progresses according to time or the ratio.

Further, the controller 350 may determine, based on a plurality of notification conditions, at least a part of a section as an activation section for activating the object. Herein, the activation section may be determined as a predetermined time interval or a predetermined time ratio. Also, the controller 350 may configure the object and the activation section corresponding to at least one of the notification conditions. Accordingly, the controller 350 may associate the object and the activation section corresponding to the notification conditions and then generate the screen configuration information.

Figure 4:
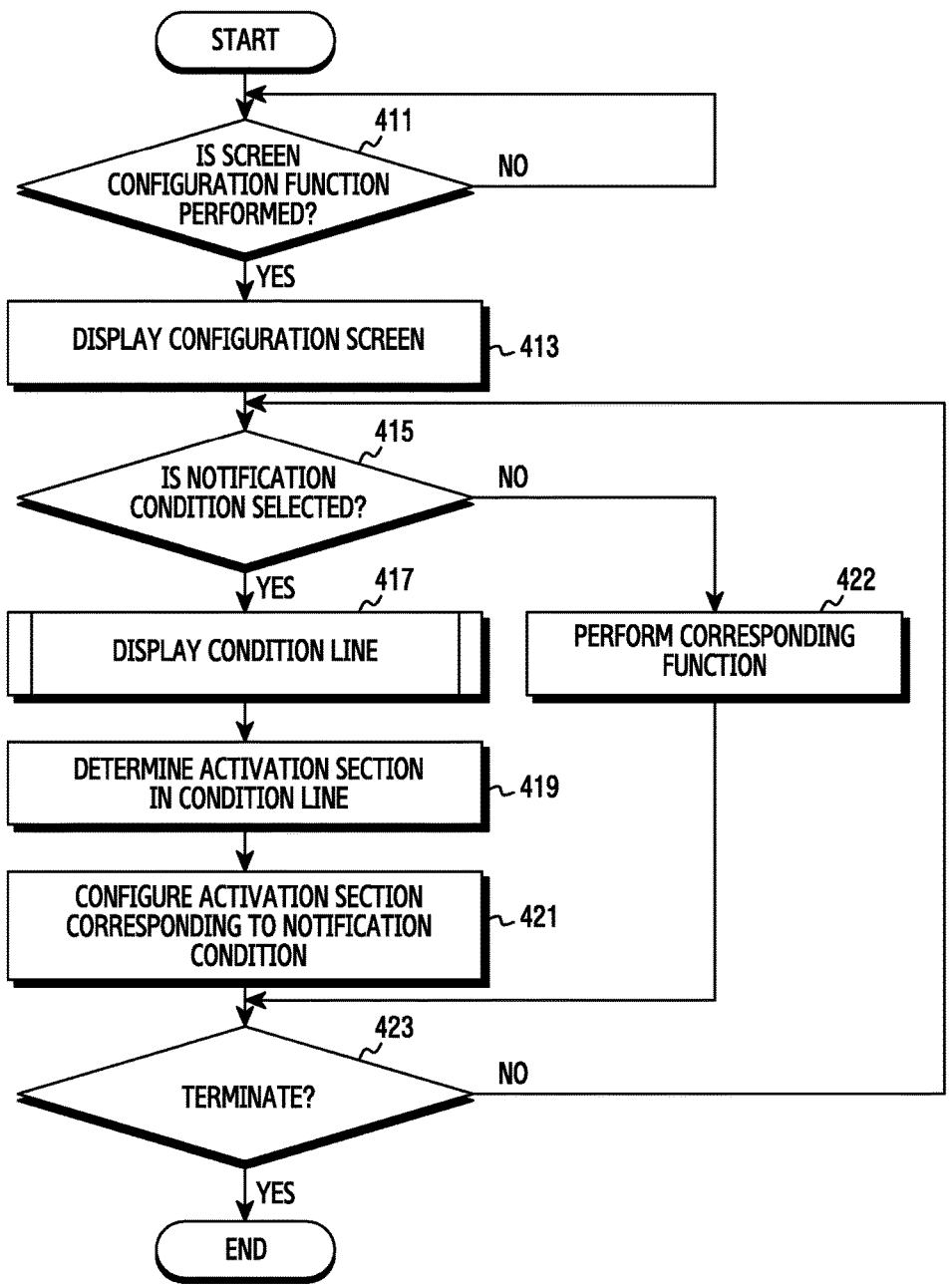
FIG. 4 is a flowchart of an operating method of the electronic device according to an embodiment of the present disclosure.

FIG. 4 is a flowchart of an operating method of the electronic device according to an embodiment of the present disclosure. Further, FIGS. 6-14 are examples of output of a display according to operational methods of the electronic device according to embodiments of the present disclosure.

Figure 6:
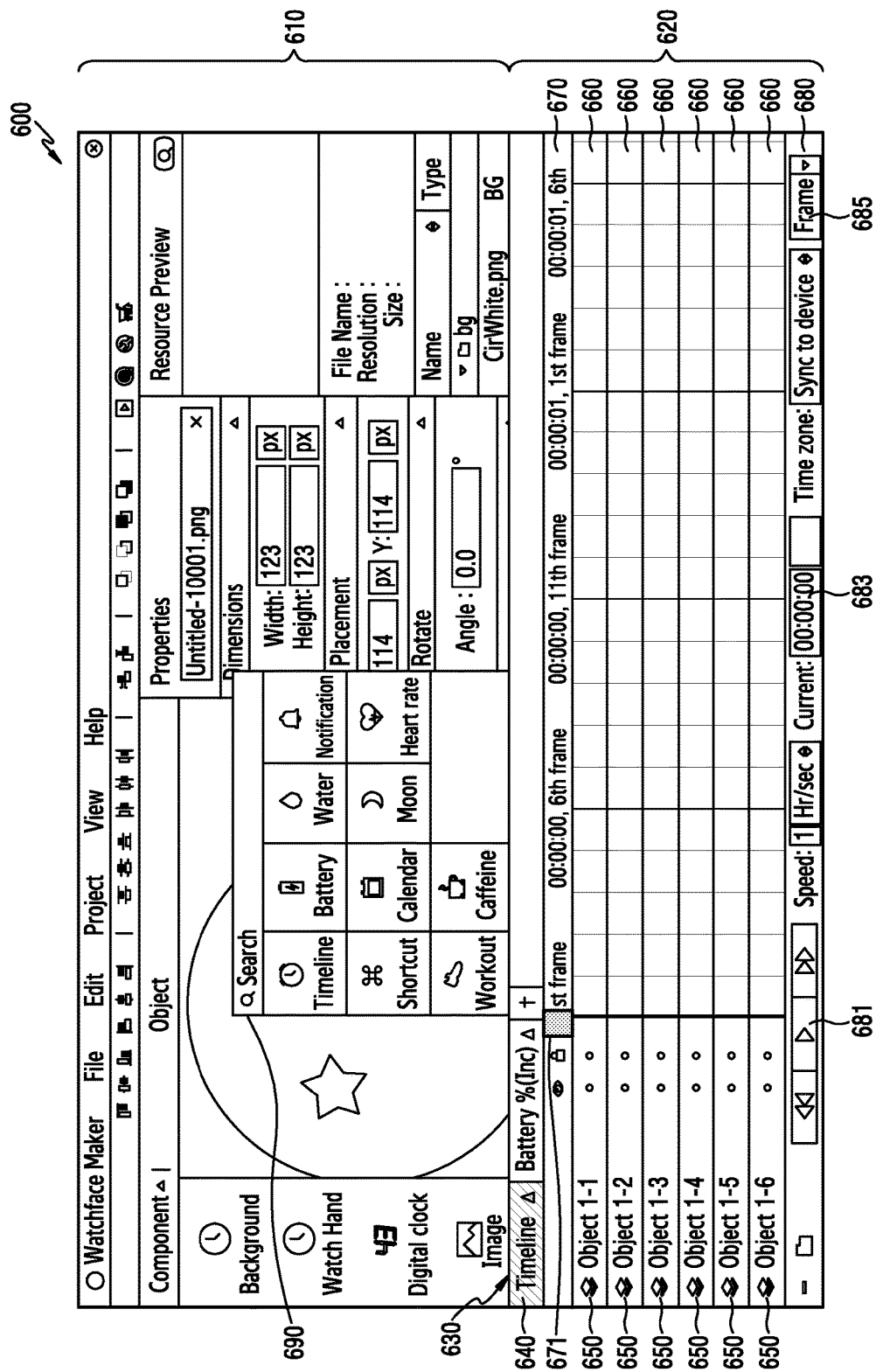
FIGS. 6, 7, 8, 9, 10, 11, 12, 13, and 14 are examples of output of a display according to operational methods of the electronic device according to embodiments of the present disclosure.

Referring to FIG. 4, an operating method of the electronic device 110 starts performing a screen configuration function by the controller 350 in step 411. For example, when an icon or a menu, to which the screen configuration function is allocated, is selected, the controller 350 may perform the screen configuration function. Further, while the screen configuration function is performed, the controller 350 may display a configuration screen 600 in step 413. In this event, the controller 350 may display the configuration screen 600 as shown in FIG. 6. The configuration screen 600 may include an editing area 610 and a configuration area 620. In addition, the controller 350 may further display a notification window 690 in the configuration screen 600.

The editing area 610 may be used to edit a screen. Further, the editing area 610 may include menus for editing at least one of a display area for displaying a state of the screen and a background or a component of the screen. Herein, the component of the screen may include at least one object. That is, in the editing area 610, the object may be edited.

The configuration area 620 may be used to configure each of the notification conditions. Further, the configuration area 620 may include at least one condition configuration window 630 corresponding to each of the notification conditions. For example, when the configuration area 620 includes a plurality of condition configuration windows 630, the condition configuration windows 630 may be overlapped or layered each other. Each of the condition configuration windows 630 may include a condition tab 640, at least one object item 650, at least one condition line 660, a reference line 670, and an adjustment panel 680.

The condition tab 640 may be provided to identify the notification conditions. That is, the condition tab 640 may represent the notification conditions. For example, when the configuration area 620 includes the plurality of condition configuration windows 630, a plurality of condition tabs 640 of the condition configuration windows 630 may be arranged side by side. Herein, even though the condition configuration windows 630 are overlapped or layered on each other, each of the plurality of condition tabs 640 may be exposed.

The object item 650 may be provided to identify an object. In this event, an object may be allocated to the object item 650. For example, the object item 650 may correspond to a folder and the object may be stored in the folder. Here, the object may include at least one of an image, an animation, an emoticon, a text, an audio signal, or a vibration signal.

The condition lines 660 may be provided to configure an activation condition of the object. In this event, the condition lines 660 may correspond to the object. That is, the condition lines 660 may correspond to the object items 650. Here, the condition lines 660 are arranged at a side of the object item 650, and may be extended from the object item 650. Further, the condition lines 660 may be defined by the time or the ratio. For example, the condition lines 660 may be a bar-type graph progressed according to time or the ratio. Here, an entire section of the condition lines 660 may be defined as a predetermined period. For example, the period may be defined as a predetermined number of frames. Further, the period may be defined as a predetermined time interval. Meanwhile, the entire section of the condition lines 660 may be defined as a predetermined width ratio. Further, the condition lines 660 may be divided into a plurality of condition sections. Here, the condition sections may be divided according to time or the ratio.

For example, the condition configuration window 630 may include the plurality of object items 650 and the plurality of condition lines 660. In this event, the condition lines 660 may be arranged side by side, and may be extended in the same direction. Here, the condition lines 660 may be arranged upward and downward or leftward and rightward side by side without intersecting each other.

The reference line 670 may be provided for reference of the condition lines 660. That is, the reference line 670 may indicate a reference line for the condition lines 660. Here, the reference line 670 may be arranged side by side on the condition lines 660, and may be extended in a direction which is same as directions of the condition lines 660. In addition, the reference line 670 may guide the time or the ratio corresponding to the condition lines 660. Further, the reference line 670 may indicate reference positions representing reference values corresponding to the condition lines 660.

In this event, the reference line 670 may include an indicator 671. The indicator 671 may move according to the condition lines 660. That is, the indicator 671 may move between a start position and a completion position of the condition line 660. Here, the indicator 671 may be extended from the reference line 670 to the condition line 660. For example, when the condition lines 660 are divided into the plurality of condition sections, the reference line 670 may indicate the reference values in at least one unit of the condition sections. Meanwhile, the indicator 671 may move between the condition sections.

The adjustment panel 680 may be provided for adjustment of the condition lines 660. In this event, the adjustment panel 680 may include one or more adjustment menus 681, 683, and 685. Here, the adjustment menus 681, 683, and 685 may include at least one of a movement menu 681 for moving the indicator 671, a position menu 683 for displaying a position of the indicator 671, and a definition menu 685 for changing the definitions of the condition lines 660.

The notification window 690 may be provided to guide at least one configurable notification condition. In this event, the notification window 690 may include at least one condition item. Here, the notification conditions may be allocated to the condition items. For example, the notification conditions may include at least one among a timeline over time, a battery state depending on the capacity in a battery, a charging state depending on whether the battery is charged, a water intake state depending on the water intake of a user, a notification state depending on a notification event, a moon state depending on a change of the shape of a moon, a heartbeat state depending on the heartbeat of the user, a workout state depending on the posture or a movement of the user, and a caffeine intake state depending on the caffeine intake of the user.

When the notification condition is selected, the controller 350 may detect the selection in step 415. In this event, when the condition configuration window 630 is selected on the configuration screen 600, the controller 350 may detect the notification condition of the condition configuration window 630. Specifically, when the condition tab 640 of the condition configuration window 630 is selected, the controller 350 may detect the notification condition of the condition configuration window 630. Further, the controller 350 may display the condition lines 660 on the basis of the notification condition in step 417. That is, the controller 350 may display the condition configuration window 630 corresponding to the notification condition. In this event, the controller 350 may display the condition configuration screen 630 as shown in FIG. 6. In particular, the controller 350 may display the condition configuration window 630 corresponding to the condition tab 640.

Figure 5:
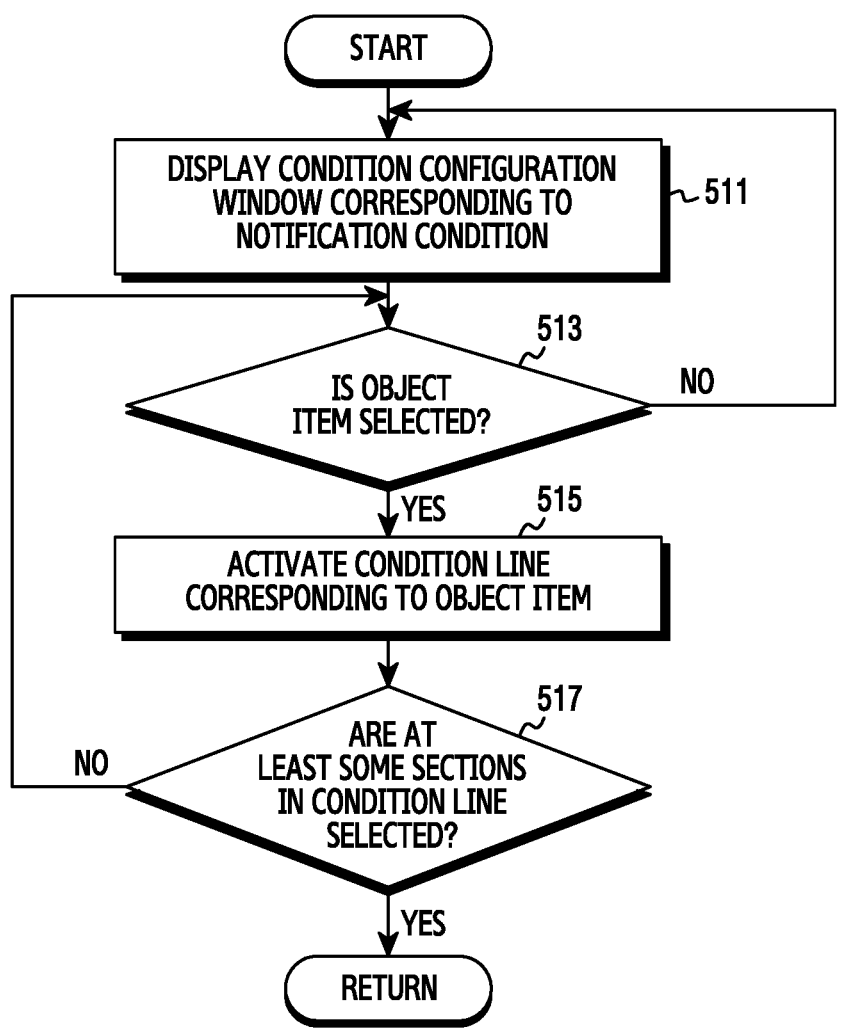
FIG. 5 is a flowchart of a condition line display operation of the method of FIG. 4.

FIG. 5 is a flowchart of a condition line display operation of FIG. 4.

Referring to FIG. 5, the controller 350 may display the condition configuration window 630 corresponding to the notification condition in step 511. The condition configuration window 630 may include the condition tab 640, the at least one object item 650, the at least one condition line 660, the reference line 670, and the adjustment panel 680. The controller 350 may add the object item 650 to the condition configuration window 630, and may remove the object item 650 from the condition configuration window 630.

The controller 350 may display the condition configuration window 630 as shown in FIG. 6. When the notification condition corresponds to the time line, the condition tab 640 may represent the time line as the notification condition. An object for being activated over time may be allocated to the object item 650. The condition line 660 may be defined by the time. Here, an entire section of the condition line 660 may be defined as a predetermined number of frames. For example, when entire sections of the condition lines 660 are defined as 15 frames, the condition line 660 may be divided into 15 condition sections. That is, on the condition line 660, the condition sections may correspond to the frames, respectively. The reference line 670 may indicate reference positions of the frames corresponding to the condition line 660. Here, the indicator 671 of the reference line 670 may be located in the start position of the condition line 660.

Next, when the object item 650 is selected on the condition configuration window 630, the controller 350 may detect the selection in step 513. In this event, when the object item 650 is directly selected, the controller 350 may detect the selection. Further, when the condition line 660 is selected, the controller 350 may detect the object item 650 corresponding to the condition line 660.

Figure 7:
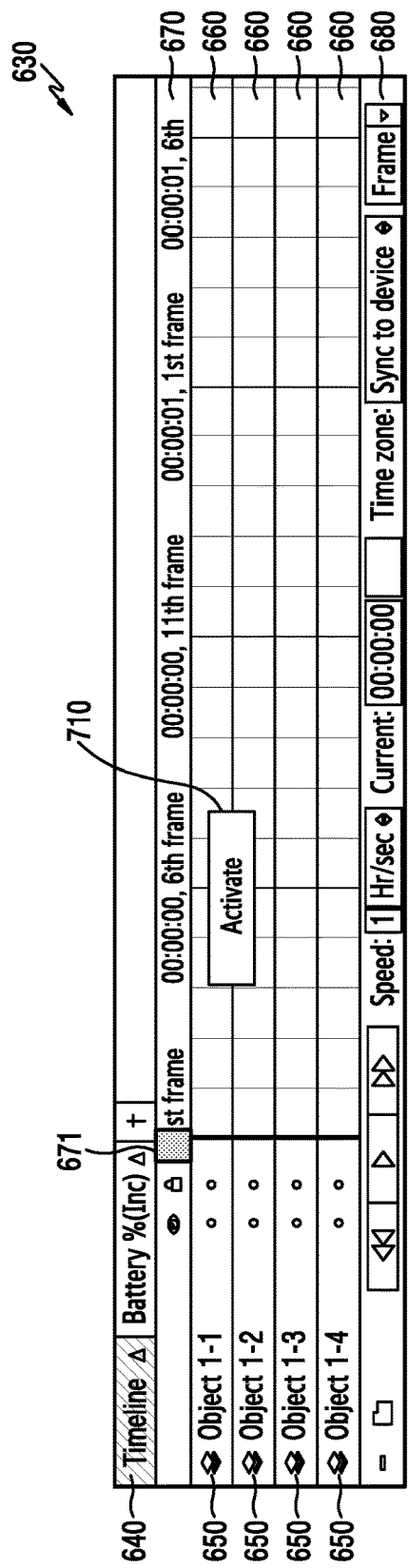

When the object item 650 is selected in an embodiment of the present disclosure, the controller 350 may determine whether to activate the condition line 660 corresponding to the object item 650 as shown in FIG. 7. In this event, the controller 350 may display an identification menu 710 corresponding to the object item 650 or the condition line 660. Here, when the identification menu 710 is not selected during a preconfigured threshold time, the controller 350 may determine that the condition line 660 is not activated. Further, the controller 350 may return to step 511. Meanwhile, when the identification menu 710 is selected, the controller 350 may determine that the condition line 660 should be activated corresponding to the object item 650. Further, the controller 350 may proceed to step 515.

Next, the controller 350 may activate the condition line 660 corresponding to the object item 650 in step 515. In this event, the controller 350 may activate the entire section of the condition line 660. To this end, the controller 350 may change at least one of a color, brightness, or saturation of the condition line 660.

Figure 8:
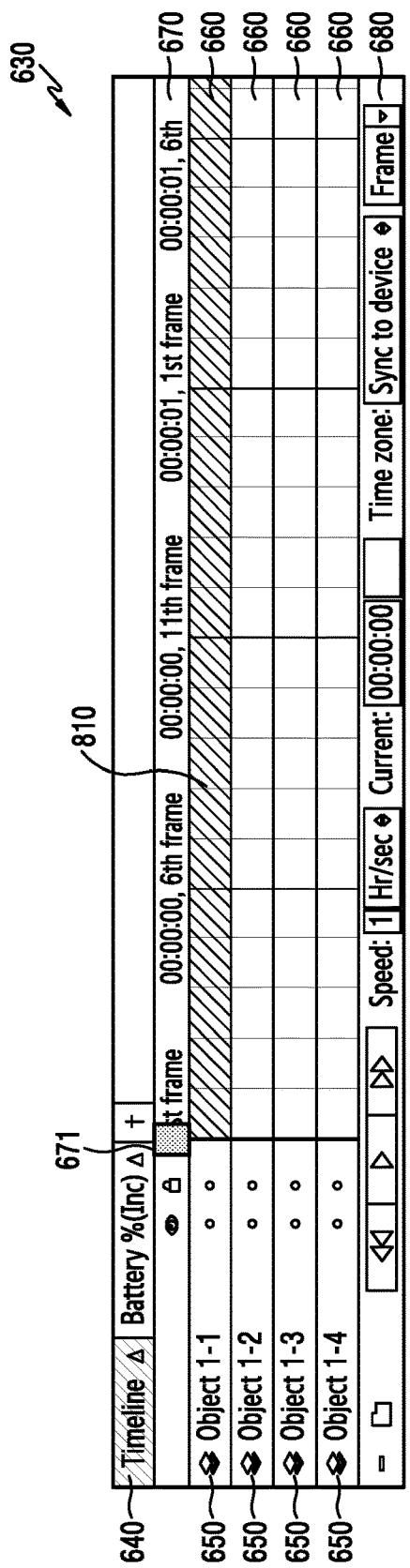

The controller 350 may activate the condition line 660 as shown in FIG. 8 in an embodiment of the present disclosure. In this event, the controller 350 may display an activation bar 810 on the condition line 660. The size of the activation bar 810 may be identical to the size of the condition line 660. Herein, the indicator 671 of the reference line 670 may be continuously located in the start position of the condition line 660, and may move in a completion position of the condition line 660 to be located the completion position.

Next, when at least a part of section of the condition line 660 is selected, the controller 350 may detect this in step 517. For example, when the condition line 660 is divided into a plurality of condition sections, at least one of the condition sections may be selected. To this end, the controller 350 may move the indicator 671 of the reference line 660 between the start position and the completion position of the condition line 660. When a part of section is selected on the condition line 660, the controller 350 may deactivate the remaining section on the condition line 660, and the operation may return to FIG. 4.

Figure 9:
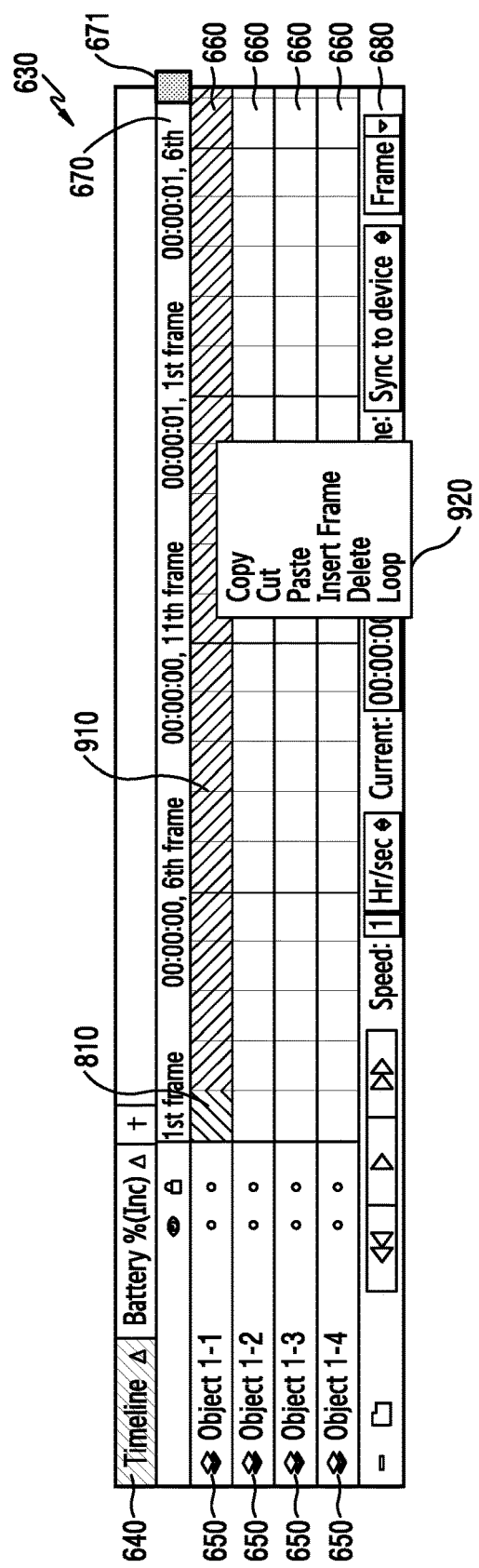

When a part of an area 910 of the activation bar 810 is selected in an embodiment of the present disclosure, the controller 350 may display a change menu 920 corresponding to a part of the area 910 of the activation bar 810 as shown in FIG. 9. In this event, when a drag is generated from a start position to a completion position of a part of the area 910 on the activation bar 810, the controller 350 may detect that a part of the area 910 is selected on the activation bar 810. Here, the controller 350 may move the indicator 671 of the reference line 670 according to a path of the drag. In addition, the change menu 920 may include at least one of a copy menu, a cut menu, a paste menu, an insert menu, a delete menu, and a loop menu. Here, when the delete menu is selected in the change menu 920, the controller 350 may deactivate a part of the area 910 of the activation bar 810. For example, the controller 350 may remove a part of the area 910 of the activation bar 810 on the condition line 660. To this end, the controller 350 may change at least one of a color, brightness, and saturation of a part of the area 910 on the activation bar 810.

Meanwhile, when at least a part of section of the condition line 660 is not selected, the controller 350 may return to step 513. Accordingly, the controller 350 may repeat at least one of steps 513 to 517.

Then, the controller 350 may determine activation sections 1010 (FIG. 10) on the condition lines 660 in step 419. That is, the controller 350 may determine at least a part of a section as the activation sections 1010 on the condition lines 660. Here, the activation sections 1010 may indicate a time or a ratio for activating an object of the object items 650. Further, the controller 350 may configure the activation sections 1010 corresponding to the notification condition in step 421. In this event, the controller 350 may associate the object item 650 and the activation sections 1010. Therefore, the controller 350 may generate or update screen configuration information corresponding to the notification condition.

Figure 10:
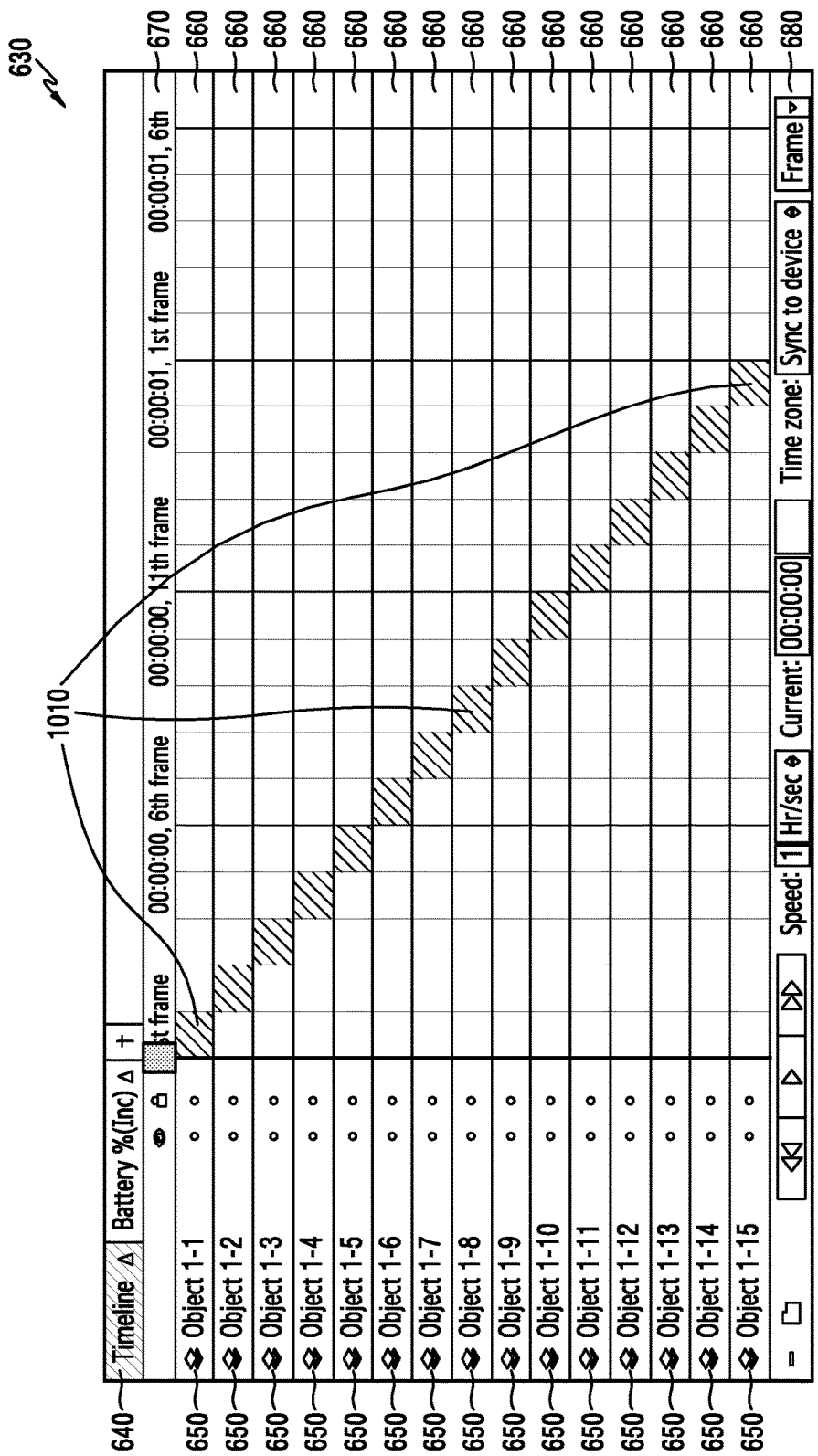

The controller 350 may determine the activation sections 1010 on the condition line 660 as shown in FIG. 10. In this event, the controller 350 may determine the activation sections 1010 corresponding to the object items 650. Here, when the notification condition is a time line, the controller 350 may determine the activation section 1010 that corresponds to at least one of the frames. Further, the controller 350 may configure the activation section 1010 that corresponds to the notification condition. Here, when the notification condition is the time line, the controller 350 may configure the object items 650 and the activation sections 1010 corresponding to the time line. Therefore, the controller 350 may generate or update screen configuration information to the object items 650 and the activation sections 1010 corresponding to the notification condition.

Meanwhile, when the notification condition is not selected in step 415, the controller 350 may perform a corresponding function in step 422. In this event, the controller 350 may edit the screen. That is, the controller 350 may edit at least one of a background or a component of the screen. Here, the controller 350 may edit by, for example, generating, changing, or removing the object. For example, the controller 350 may edit the object through the editing area 610. Further, the controller 350 may, for example, edit, generate, change, or remove the condition configuration window 630. For example, when the condition item is selected in the notification window 690, the controller 350 may identify the notification condition of the condition item and may determine whether the condition configuration window 630 of the corresponding notification condition exists. When the condition configuration window 630 does not exist, the controller 350 may generate the condition configuration window 630.

When the screen configuration function is terminated, the controller 350 may detect this in step 423, and then, the controller 350 may terminate an operation method of the electronic device 110.

Meanwhile, when the screen configuration function is not terminated in step 421, the controller 350 may return to step 415. Accordingly, the controller 350 may repeat and perform at least one of steps 415 to 421. Therefore, the controller 350 may generate or update screen configuration information corresponding to the notification condition. Here, the controller 350 may update screen configuration information to a plurality of object items 650 and activation sections 1010 corresponding to the notification condition. In this event, the controller 350 may associate the object items 650 and the activation sections 1010 with each other.

The controller 350 may configure the plurality of activation sections 1010 on the condition configuration window 630 as shown in FIG. 10, in an embodiment of the present disclosure. That is, the controller 350 may configure the activation sections 1010 on the plurality of condition lines 660. In this event, the activation sections 1010 may not be overlapped each other. Here, the controller 350 may configure one of the activation sections 1010 on one of the condition lines 660. Further, the controller 350 may configure the activation sections 1010 corresponding to the time line. In this event, the controller 350 may associate the object items 650 and the activation sections 1010 with each other. Therefore, the controller 350 may generate or update screen configuration information to the object items 650 and the activation sections 1010 corresponding to the notification condition.

For example, the condition configuration window 630 may include 15 object items 650 and 15 condition lines 660, and the object items 650 may correspond to the condition lines 660, respectively. Here, the object items 650 may include a first object (object 1-1), a second object (object 1-2), a third object (object 1-3), a fourth object (object 1-4), a fifth object (object 1-5), a sixth object (object 1-6), a seventh object (object 1-7), an eighth object (object 1-8), a ninth object (object 1-9), a tenth object (object 1-10), an eleventh object (object 1-11), a twelfth object (object 1-12), a thirteenth object (object 1-13), a fourteenth object (object 1-14), and a fifteenth object (object 1-15). Further, an entire section of the condition line 660 may be defined as 15 frames. In this event, the condition line 960 may be divided into 15 condition sections. That is, on the condition line 960, each condition section may correspond to each frame. Further, the controller 350 may configure a first frame as the activation section 1010 corresponding to the first object (object 1-1) and configure a second frame as the activation section 1010 corresponding to the second object (object 1-2). Likewise, the controller 350 may match the third object (object 1-3), the fourth object (object 1-4), the fifth object (object 1-5), the sixth object (object 1-6), the seventh object (object 1-7), the eighth object (object 1-8), the ninth object (object 1-9), the tenth object (object 1-10), the eleventh object (object 1-11), the twelfth object (object 1-12), the thirteenth object (object 1-13), the fourteenth object (object 1-14), and the fifteenth object (object 1-15) with a third frame, a fourth frame, a fifth frame, a sixth frame, a seventh frame, an eighth frame, a ninth frame, a tenth frame, an eleventh frame, a twelfth frame, a thirteenth frame, a fourteenth frame, and a fifteenth frame, respectively. Therefore, the controller may configure the matched frames as the activation section 1010.

That is, the controller 350 may generate or update the screen configuration information by performing the screen configuration function. In this event, the controller 350 may generate or update screen configuration information corresponding to various notification conditions. For example, the notification condition may include at least one of a time line, a battery state, a charging state, or a movement state.

Accordingly, the external device 120 may display a screen on the basis of the screen configuration information. In this event, the electronic device 120 may analyze the screen configuration information. Herein, the external device 120 may detect the screen configuration information corresponding to at least one notification condition. Further, the external device 120 may activate the at least one object on the screen according to time or the ratio. That is, the external device 120 may detect the at least one object item 650 and the activation section 1010 corresponds to the at least one notification condition. Further, the external device 120 may activate objects of the object items 650 corresponding to the activation sections 660.

For example, the external device 120 may sequentially activate the first object (object 1-1), the second object (object 1-2), the third object (object 1-3), the fourth object (object 1-4), the fifth object (object 1-5), the sixth object (object 1-6), the seventh object (object 1-7), the eighth object (object 1-8), the ninth object (object 1-9), the tenth object (object 1-10), the eleventh object (object 1-11), the twelfth object (object 1-12), the thirteenth object (object 1-13), the fourteenth object (object 1-14), and the fifteenth object (object 1-15) corresponding to the 15 frames.

Figure 11:
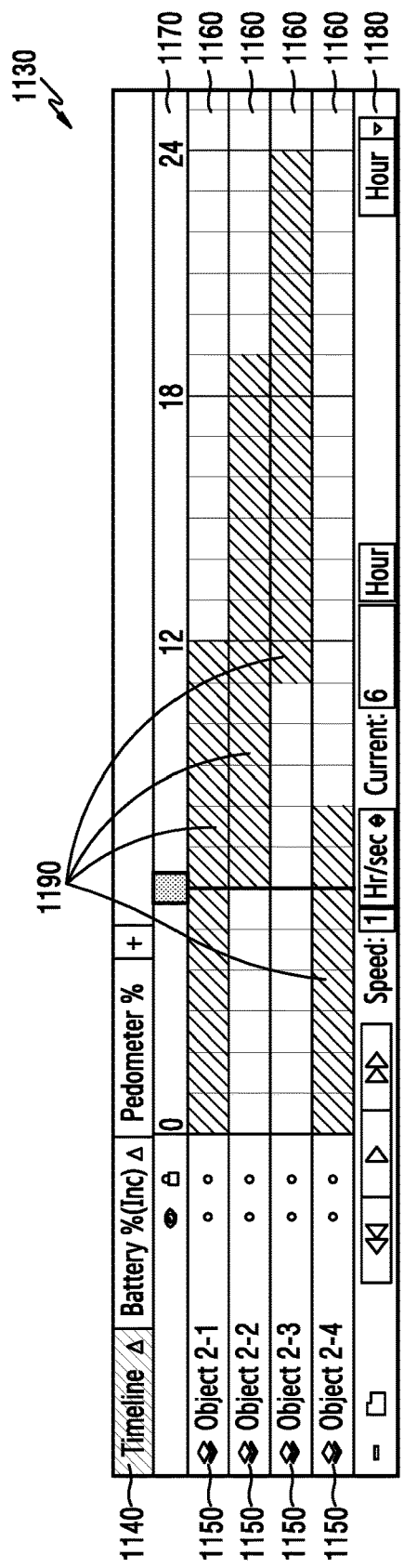

When the notification condition is the time line in an embodiment of the present disclosure, the controller 350 may display a condition configuration window 1130 as shown in FIG. 11. The condition configuration window 1130 may include a condition tab 1140, at least one object item 1150, at least one condition line 1160, a reference line 1170, and an adjustment panel 1180. The condition tab 1140 may indicate a time line as a notification condition. Objects for being activated over time may be allocated to the object items 1150. The condition lines 1160 may be defined by the time. For example, the condition configuration window 1130 may include 4 object items 1150 and 4 condition lines 1160, and the object items 1150 may correspond to the condition lines 1160, respectively. In this event, a first object (object 2-1), a second object (object 2-2), a third object (object 2-3), and a fourth object (object 2-4) may be allocated to the object items 1150, respectively. Further, an entire section of the condition line 1160 may be defined as 24 hours, e.g., 00:00 hours to 24:00 hours, i.e., midnight to midnight. In this event, the condition line 1160 may be divided into 24 condition sections. That is, on the condition line 1160, each condition section may correspond to 1 hour.

Further, the controller 350 may configure at least one activation section 1190 in the condition configuration window 1130. Therefore, the controller 350 may generate or update screen configuration information to at least one object item 1150 and the activation sections 1190 corresponding to the time line. For example, the controller 350 may configure at least one activation section 1190 in each condition line 1160 corresponding to each object item 1150. In this event, the controller 350 may configure 00:00 hours to 12:00 hours as the activation section 1190 corresponding to the first object (object 2-1). Further, the controller 350 may configure 06:00 hours to 19:00 hours as the activation section 1190 corresponding to the second object (object 2-2). Further, the controller 350 may configure 11:00 hours to 24:00 hours as the activation section 1190 corresponding to the third object (object 2-3). Also, the controller 350 may configure 00:00 hours to 20:00 hours as the activation section 1190 corresponding to the fourth object (object 2-4).

Accordingly, the external device 120 may display a screen on the basis of the screen configuration information. That is, the external device 120 may control the screen according to the time. For example, the external device 120 may activate an object of each object item 1150 on the screen in the activation sections 1190. In this event, from 00:00 hours to 12:00 hours, the external device 120 may activate the first object (object 2-1). Further, from 06:00 hours to 21:00 hours, the external device 120 may activate the second object (object 2-2). Further, from 11:00 hours to 24:00 hours, the external device 120 may activate the third object (object 2-3). In addition, from 00:00 hours to 20:00 hours, the external device 120 may activate the fourth object (object 2-4).

That is, from 00:00 hours to 18:00 hours, the external device 120 may activate the first object (object 2-1) and the fourth object (object 2-4). Further, from 06:00 hours to 20:00 hours, the external device 120 may activate the first object (object 2-1), the second object (object 2-2), and the fourth object (object 2-4). In addition, from 08:00 hours to 11:00 hours, the external device 120 may activate the first object (object 2-1) and the second object (object 2-2). Further, from 11:00 hours to 12:00 hours, the external device 120 may activate the first object (object 2-1), the second object (object 2-2), and the third object (object 2-3). Further, from 12:00 hours to 19:00 hours, the external device 120 may activate the second object (object 2-2) and the third object (object 2-3). In addition, the external device 120 may activate the third object (object 2-3).

Figure 12:
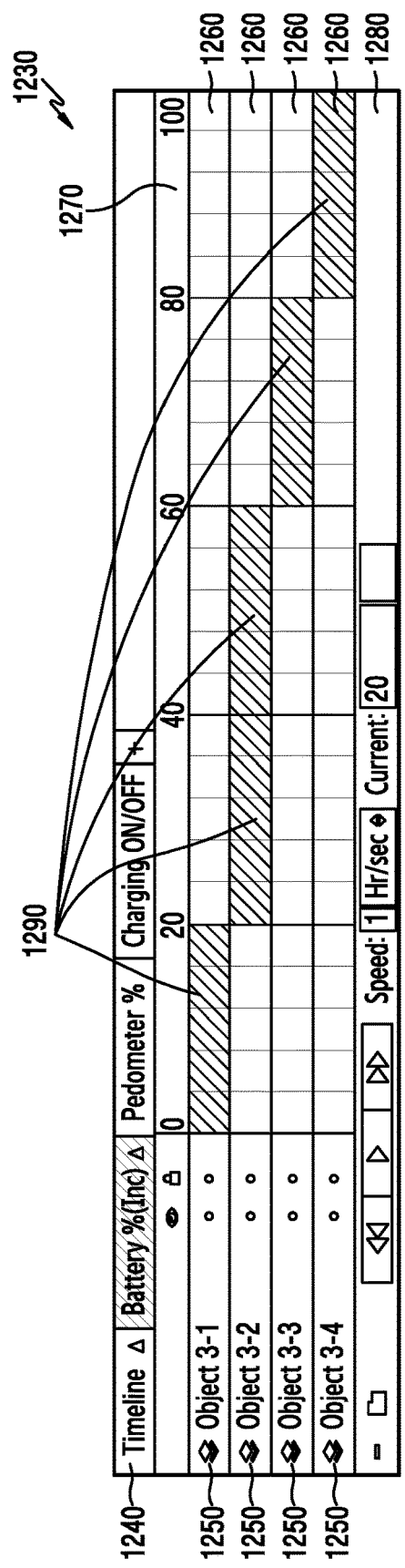

When the notification condition is a battery state, the controller 350 may display a condition configuration window 1230 as shown in FIG. 12. The condition configuration window 1230 may include a condition tab 1240, at least one object item 1250, at least one condition line 1260, a reference line 1270, and an adjustment panel 1280. The condition tab 1240 may indicate a battery state as the notification condition. Here, the battery state may indicate a ratio of a full capacity to the remaining capacity of the battery. Objects for being activated according to the battery state may be allocated to the object items 1250. The condition lines 1260 may be defined by the ratio. For example, the condition configuration window 1230 may include 4 object items 1250 and 4 condition lines 1260, and the object items 1250 may correspond to the condition lines 1260, respectively. In this event, a first object (object 3-1), a second object (object 3-2), a third object (object 3-3), and a fourth object (object 3-4) may be allocated to the object items 1250, respectively. Further, an entire section of the condition line 1260 may be defined as 100%. In this event, the condition line 1260 may be divided into 25 condition sections. That is, on the condition line 1260, each condition section may correspond to 4%.

Further, the controller 350 may configure at least one activation section 1290 in the condition configuration window 1230. Therefore, the controller 350 may generate or update screen configuration information to at least one object item 1250 and the activation sections 1290 corresponding to the battery state. For example, the controller 350 may configure at least one activation section 1290 in each condition line 1260 to correspond to each object item 1250. In this event, the controller 350 may configure 0 to 20% as the activation section 1290 corresponding to the first object (object 3-1). In this event, the controller 350 may configure 20 to 60% as the activation section 1290 to correspond to the second object (object 3-2). Further, the controller 350 may configure 60 to 80% as the activation section 1290 corresponding to the third object (object 3-3). In addition, the controller 350 may configure 80 to 100% as the activation section 1290 corresponding to the fourth object (object 3-4).

Accordingly, the external device 120 may display a screen on the basis of the screen configuration information. That is, the external device 120 may control the screen according to the battery state, i.e., a ratio of a full capacity to the remaining capacity of the battery. For example, the external device 120 may activate an object of each object item 1250 on the screen in each activation section 1290. In this event, while the battery state corresponds to 0 to 20%, the external device 120 may activate the first object (object 3-1) on the screen. Further, while the battery state corresponds to 20 to 60%, the external device 120 may activate the second object (object 3-2). Further, while the battery state corresponds to 60 to 80%, the external device 120 may activate the third object (object 3-3). Further, while the battery state corresponds to 80 to 100%, the external device 120 may activate the fourth object (object 3-4).

Figure 13:
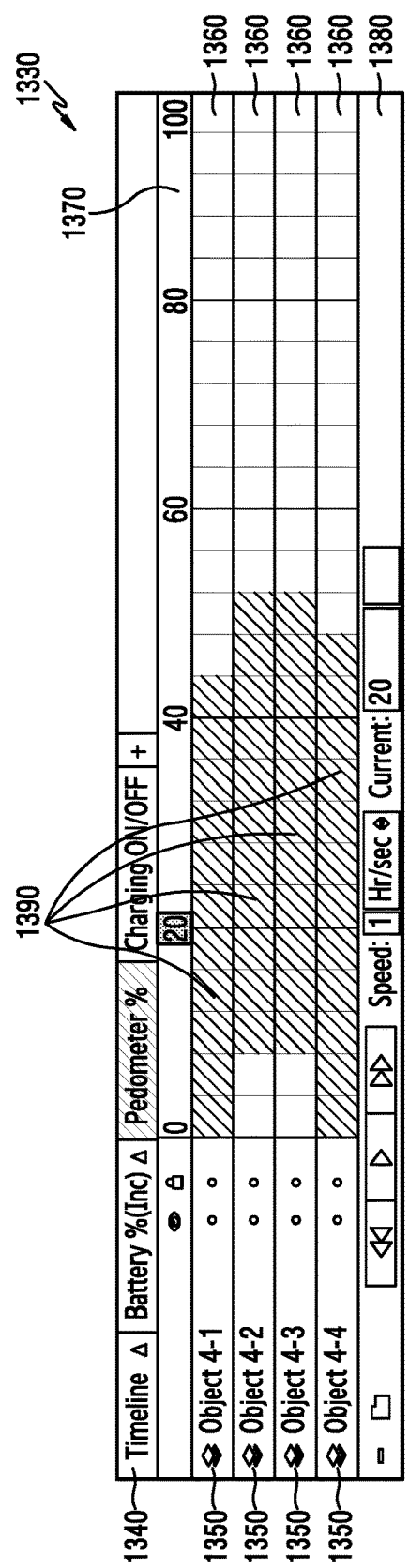

When the notification condition is a movement state, e.g., a pedometer state, the controller 350 may display a condition configuration window 1330 as shown in FIG. 13 in an embodiment of the present disclosure. The condition configuration window 1330 may include a condition tab 1340, at least one object item 1350, at least one condition line 1360, a reference line 1370, and an adjustment panel 1380. The condition tab 1340 may indicate a pedometer state as the notification condition. Here, the pedometer state may indicate a ratio of the number of actually taken steps to a target number of steps. Objects for being activated according to the pedometer state may be allocated to the object items 1350. The condition lines 1360 may be defined by the ratio. For example, the condition configuration window 1330 may include 4 object items 1350 and 4 condition lines 1360, and the object items 1350 may correspond to the condition lines 1360, respectively. In this event, a first object (object 4-1), a second object (object 4-2), a third object (object 4-3), and a fourth object (object 4-4) may be allocated to the object items 1350, respectively. Further, an entire section of the condition line 1360 may be defined as 100%. In this event, the condition line 1360 may be divided into 25 condition sections. That is, on the condition line 1360, each condition section may correspond to 4%.

Further, the controller 350 may configure at least one activation section 1290 in the condition configuration window 1330. Therefore, the controller 350 may generate or update screen configuration information corresponding to at least one object item 1350 and the activation sections 1390 corresponding to the pedometer state. For example, the controller 350 may configure at least one activation section 1390 in each condition line 1360 corresponding to each object item 1350. In this event, the controller 350 may configure 0 to 44% as the activation section 1390 corresponding to the first object (object 4-1). In addition, the controller 350 may configure 8 to 52% as the activation section 1390 corresponding to the second object (object 4-2). Further, the controller 350 may configure 8 to 52% as the activation section 1390 corresponding to the third object (object 4-3). In addition, the controller 350 may configure 0 to 48% as the activation section 1390 corresponding to the fourth object (object 4-4).

Accordingly, the external device 120 may display a screen on the basis of the screen configuration information. That is, the external device 120 may control the screen according to the pedometer state, i.e., the ratio of the number of actually taken steps to a target number of steps. For example, the external device 120 may activate an object of each object item 1350 on the screen in each activation section 1390. In this event, while the pedometer state corresponds to 0 to 44%, the external device 120 may activate the first object (object 4-1). Further, while the pedometer state corresponds to 8 to 52%, the external device 120 may activate the second object (object 4-2). Further, while the pedometer state corresponds to 8 to 52%, the external device 120 may activate the third object (object 4-3). Further, while the pedometer state corresponds to 0 to 48%, the external device 120 may activate the fourth object (object 4-4).

Figure 14:
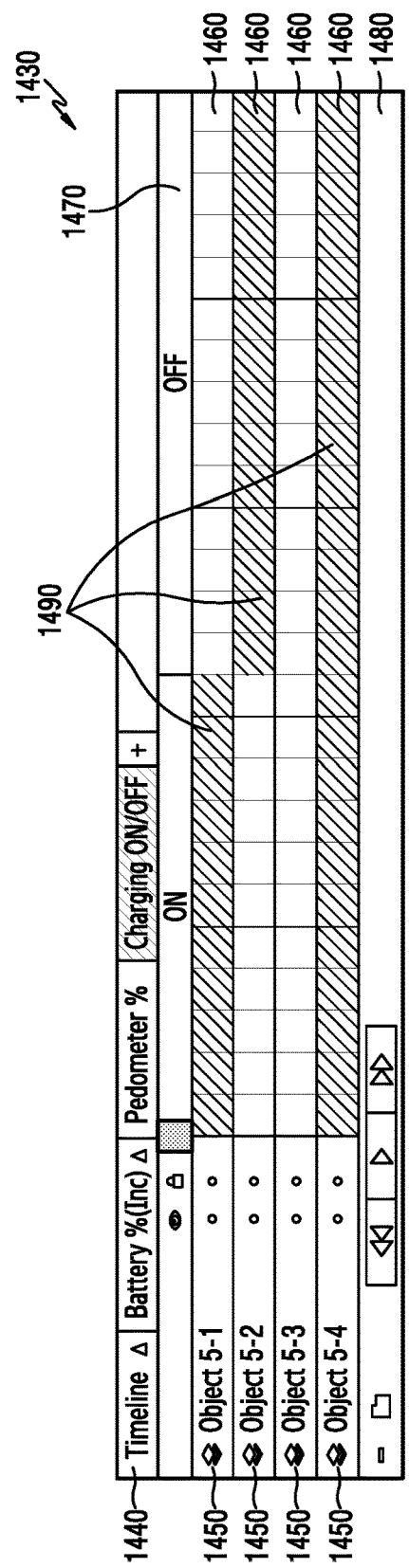

That is, while the pedometer state corresponds to 0 to 8%, the external device 120 may activate the first object (object 4-1) and the fourth object (object 4-4). Further, while the pedometer state corresponds to 8 to 44%, the external device 120 may activate the first object (object 4-1), the second object (object 4-2), the third object (object 4-3), and the fourth object (object 4-4). Further, while the pedometer state corresponds to 44 to 48%, the external device 120 may activate the second object (object 4-2), the third object (object 4-3), and the fourth object (object 4-4). Further, while the pedometer state corresponds to 48 to 52%, the external device 120 may activate the second object (object 4-2) and the third object (object 4-3). When the notification condition is a charging state in another embodiment of the present disclosure, the controller 350 may display a condition configuration window 1430 as shown in FIG. 14. The condition configuration window 1430 may include a condition tab 1440, at least one object item 1450, at least one condition line 1460, a reference line 1470, and an adjustment panel 1480. The condition tab 1440 may indicate the charging state as the notification condition. Here, the charging state may indicate charging on/off. Objects for being activated according to the charging state may be allocated to the object items 1450. For example, the condition configuration window 1430 may include 4 object items 1450 and 4 condition lines 1460, and the object items 1450 may correspond to the condition lines 1460, respectively. In this event, a first object (object 5-1), a second object (object 5-2), a third object (object 5-3), and a fourth object (object 5-4) may be allocated to the object items 1450, respectively. Further, the condition line 1460 may be divided into 2 condition sections. That is, in the condition lines 1460, one of the condition sections may correspond to charging on and another section may correspond to charging off.

Further, the controller 350 may configure at least one activation section 1490 in the condition configuration window 1430. Therefore, the controller 350 may generate or update screen configuration information to at least one object item 1450 and the activation sections 1490 corresponding to the charging state. For example, the controller 350 may configure at least one activation section 1490 in each condition line 1460 corresponding to each object item 1450. In this event, the controller 350 may configure charging on as the activation section 1490 corresponding to the first object (object 5-1). Further, the controller 350 may configure charging off as the activation section 1490 corresponding to the second object (object 5-2). Further, the controller 350 may configure charging on/off as the activation section 1490 corresponding to the fourth object (object 5-4).

Accordingly, the external device 120 may display a screen on the basis of the screen configuration information. That is, the external device 120 may control the screen according to the charging state, e.g., charging on/off. For example, the external device 120 may activate an object of each object item 1450 on the screen in each activation section 1490. In this event, while the charging state is on, the external device 120 may activate the first object (object 5-1). In this event, while the charging state is off, the external device 120 may activate the second object (object 5-2). In this event, while the charging state is on or off, the external device 120 may activate the fourth object (object 5-4).

That is, while the charging state is on, the external device 120 may activate the first object (object 5-1) and the fourth object (object 5-4). That is, while the charging state is off, the external device 120 may activate the second object (object 5-2) and the fourth object (object 5-4) on the screen.

The electronic device 110 may provide at least one condition line 660, 1160, 1260, 1360, and 1460 corresponding to the notification condition, and generate screen configuration information using the condition lines 660, 1160, 1260, 1360, and 1460. That is, a user of the electronic device 110 may generate the screen configuration information as a user selects at least a part of a section in the condition lines 660, 1160, 1260, 1360, and 1460. Accordingly, the electronic device 110 may generate the screen configuration information without writing a script. Therefore, the electronic device 110 may easily generate the screen configuration information, thereby improving the use efficiency and user convenience of the electronic device 110.

The electronic device provides at least one condition line corresponding to a notification condition, and generates screen configuration information using condition lines. That is, a user of the electronic device may generate the screen configuration information as the user selects at least a part of a section in the condition lines. Accordingly, the electronic device may generate the screen configuration information without writing a script. Therefore, the electronic device easily generates the screen configuration information, thereby improving user efficiency and convenience of using the electronic device.

Embodiments of the present disclosure shown and described in this specification and the drawings correspond to specific examples presented in order to easily explain technical contents of the present disclosure, and to help comprehension of the present disclosure, but are not intended to limit the scope of the present disclosure.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A method of operating an electronic device, the method comprising:
   in response to receiving a request for generating a screen of an external device, displaying a configuration window comprising a plurality of objects;
   identifying objects to be used as a component of the screen of the external device;
   displaying condition lines for each of the identified objects;
   determining activation sections for each of the identified objects based on an input on the displayed condition lines; and
   transmitting information for the identified objects and the determined activation sections to the external device,
   wherein the determined activation sections include a condition to activate the identified objects on the screen of the external device, and
   wherein the determined activation sections comprise at least a part of a section of a condition line.

2. The method of claim 1, wherein displaying the condition lines comprises, in response to receiving an input for selecting an activation condition, displaying each of the condition lines corresponding to the selected activation condition.

3. The method of claim 1, wherein displaying the condition lines comprises, in response to receiving an input for selecting a condition line, activating the selected condition line, and deactivating the remaining condition lines.

4. The method of claim 1, wherein determining the activation sections comprises displaying an indicator for selecting at least the part of the section of the condition line.

5. The method of claim 4, wherein determining the activation sections comprises determining an activation section based on an input for changing a position of the indicator.

6. The method of claim 2, wherein the activation condition comprises one of a timeline, a battery state, a charging state, a water intake state, a notification state, a moon state, a heartbeat state, a workout state, and a caffeine intake state.

7. The method of claim 1, wherein the condition line is defined according to one of time and a ratio.

8. The method of claim 1, wherein the plurality of objects comprises one of an image, an animation, an emoticon, a text, an audio signal, and a vibration signal.

9. The method of claim 1, wherein the external device activates the object based on the activation sections transmitted by the electronic device.

10. An electronic device comprising:
a communication unit configured to establish a communication with an external device;
a display unit; and
a controller connected to the display unit and the communication unit, and configured to control:
displaying a configuration window comprising a plurality of objects in response to receiving a request for generating a screen of the external device,
identifying objects to be used as a component of the screen of the external device,
displaying condition lines for each of the identified objects,
determining activation sections for each of the identified objects based on an input on the displayed condition lines, and
transmitting information for the identified objects and the determined activation sections to the external device,
wherein the determined activation sections include a condition to activate the identified objects on the screen of the external device, and
wherein the determined activation sections comprise at least a part of a section of a condition line.

11. The electronic device of claim 10, wherein displaying the condition lines comprises, in response to receiving an input for selecting an activation condition, displaying each of the condition lines corresponding to the selected activation condition.

12. The electronic device of claim 10, wherein displaying the condition lines comprises, in response to receiving an input for selecting a condition line, activating the selected condition line, and deactivating the remaining condition lines.

13. The electronic device of claim 10, wherein the controller is further configured to control displaying an indicator for selecting at least the part of the section of the condition line.

14. The electronic device of claim 13, wherein the determining the activation sections comprises determining an activation section based on an input for changing a position of the indicator.

15. The electronic device of claim 11, wherein the activation condition comprises at least one of a timeline, a battery state, a charging state, a water intake state, a notification state, a moon state, a heartbeat state, a workout state, and a caffeine intake state.

16. The electronic device of claim 10, wherein the condition line is defined according to one of time and a ratio.

17. The electronic device of claim 10, wherein the plurality of objects comprises at least one of an image, an animation, an emoticon, a text, an audio signal, and a vibration signal.

18. The electronic device of claim 10, wherein the external device activates the object based on the activation sections transmitted by the electronic device.

* * * * *